US012755950B2

(12) United States Patent
Bedford et al.

(10) Patent No.: US 12,755,950 B2
(45) Date of Patent: Oct. 6, 2026

(54) AUTOMATED SYSTEMS AND METHODS FOR SEPARATING COMPOUNDS

(71) Applicant: DH Technologies Development Pte. Ltd., Singapore (SG)

(72) Inventors: Leigh Bedford, Whitby (CA); Bradley B. Schneider, Bradford (CA)

(73) Assignee: DH Technologies Development Pte. Ltd., Singapore (SG)

( * ) Notice: Subject to any disclaimer, the term of this patent is extended or adjusted under 35 U.S.C. 154(b) by 262 days.

(21) Appl. No.: 18/571,482

(22) PCT Filed: Jun. 22, 2022

(86) PCT No.: PCT/IB2022/055798
§ 371 (c)(1),
(2) Date: Dec. 18, 2023

(87) PCT Pub. No.: WO2022/269517
PCT Pub. Date: Dec. 29, 2022

(65) Prior Publication Data

US 2024/0282564 A1 Aug. 22, 2024

Related U.S. Application Data

(60) Provisional application No. 63/213,352, filed on Jun. 22, 2021.

(51) Int. Cl.
*H01J 49/04* (2006.01)
*G01N 27/623* (2021.01)
*G01N 27/624* (2021.01)

(52) U.S. Cl.
CPC ........ *H01J 49/0422* (2013.01); *G01N 27/623* (2021.01); *G01N 27/624* (2013.01); *H01J 49/0431* (2013.01); *H01J 49/0468* (2013.01)

(58) Field of Classification Search
CPC ............... H01J 49/0422; H01J 49/0431; H01J 49/0468; G01N 27/623; G01N 27/624
See application file for complete search history.

(56) References Cited

U.S. PATENT DOCUMENTS 6,593,568 B1 7/2003 Whitehouse et al.
7,923,681 B2 4/2011 Collings et al.
(Continued)

FOREIGN PATENT DOCUMENTS

WO WO-2009143616 A1 * 12/2009 ........... G01N 27/624
WO WO-2009143623 A1 * 12/2009 ............ H01J 49/004
(Continued)

OTHER PUBLICATIONS

Barnett et al., "Characterization of a temperature-controlled FAIMS system", Journal of the American Society for Mass Spectrometry, Elsevier, vol. 18, No. 9, Aug. 25, 2007, pp. 1653-1663.
(Continued)

*Primary Examiner* — David A Vanore
(74) *Attorney, Agent, or Firm* — Merchant & Gould P.C.

(57) ABSTRACT

A gas introduction system for a differential mobility spectrometer (DMS) includes a manifold including a gas inlet and a gas outlet. A mixing channel fluidically couples the gas inlet to the gas outlet. A plurality of modifier liquid supply inlets is coupled to the mixing channel and a plurality of selectively operable valves. One of the plurality of selectively operable valves is coupled to one of the plurality of modifier liquid supply inlets. A control system is in communication with each of the plurality of the selectively operable valves. The control system is configured to actuate each of the plurality of selectively operable valves.

11 Claims, 13 Drawing Sheets

(56) References Cited

U.S. PATENT DOCUMENTS

| | | | | |
|---|---|---|---|---|
| 9,305,762 | B2 * | 4/2016 | Covey | H01J 49/26 |
| 9,425,031 | B2 * | 8/2016 | Schneider | H01J 49/004 |
| 9,846,143 | B2 * | 12/2017 | Blagojevic | G01N 27/624 |
| 10,276,358 | B2 * | 4/2019 | Wu | H01J 49/061 |
| 10,770,277 | B2 | 9/2020 | Datwani et al. | |
| 2003/0052263 | A1 | 3/2003 | Kaufman et al. | |
| 2003/0062474 | A1 | 4/2003 | Baranov et al. | |
| 2004/0206901 | A1 * | 10/2004 | Chen | G01N 30/7266 250/288 |
| 2005/0029449 | A1 | 2/2005 | Miller | |
| 2005/0040330 | A1 | 2/2005 | Kaufman | |
| 2005/0178964 | A1 | 8/2005 | Guevremont et al. | |
| 2005/0194532 | A1 | 9/2005 | Guevremont | |
| 2006/0124846 | A1 * | 6/2006 | Covey | H01J 49/063 250/288 |
| 2008/0073502 | A1 * | 3/2008 | Schneider | H01J 49/0095 250/288 |
| 2009/0152458 | A1 | 6/2009 | Vilkov et al. | |
| 2009/0294648 | A1 * | 12/2009 | Schneider | G01N 27/624 250/288 |
| 2009/0294650 | A1 * | 12/2009 | Schneider | G01N 27/624 250/288 |
| 2010/0237233 | A1 * | 9/2010 | Covey | H01J 49/421 250/281 |
| 2010/0282966 | A1 * | 11/2010 | Schneider | G01N 27/623 250/282 |
| 2011/0183431 | A1 * | 7/2011 | Covey | H01J 49/26 250/282 |
| 2014/0339416 | A1 | 11/2014 | Vidal-De-Miguel et al. | |
| 2016/0118234 | A1 * | 4/2016 | Covey | H01J 49/145 250/288 |
| 2016/0187296 | A1 * | 6/2016 | Blagojevic | G01N 27/624 250/288 |
| 2017/0053789 | A1 | 2/2017 | Allsworth | |
| 2018/0269048 | A1 | 9/2018 | Jarvis | |
| 2019/0086363 | A1 * | 3/2019 | Covey | H01J 49/067 |
| 2019/0157060 | A1 | 5/2019 | Datwani | |
| 2021/0005441 | A1 | 1/2021 | Booy | |
| 2021/0366699 | A1 | 11/2021 | Campbell et al. | |
| 2023/0176010 | A1 * | 6/2023 | Covey | G01N 27/624 250/252.1 |
| 2023/0288372 | A1 * | 9/2023 | Bedford | G01N 27/624 |
| 2024/0085373 | A1 | 3/2024 | Campbell et al. | |
| 2024/0175846 | A1 * | 5/2024 | Covey | G01N 27/624 |
| 2024/0255467 | A1 | 8/2024 | Bedford | |
| 2024/0282564 | A1 * | 8/2024 | Bedford | H01J 49/0431 |

FOREIGN PATENT DOCUMENTS

| | | | | |
|---|---|---|---|---|
| WO | 2012/167254 | | 12/2012 | |
| WO | WO-2012167254 | A1 * | 12/2012 | G01N 27/624 |
| WO | WO-2013171571 | A1 * | 11/2013 | G01N 27/622 |
| WO | 2015/022573 | | 2/2015 | |
| WO | 2016/108126 | | 7/2016 | |
| WO | WO-2016108126 | A1 * | 7/2016 | G01N 27/624 |
| WO | WO-2017093898 | A1 * | 6/2017 | G01N 27/624 |
| WO | WO-2017158534 | A1 * | 9/2017 | G01N 27/624 |
| WO | WO-2021156775 | A1 * | 8/2021 | G01N 27/624 |
| WO | WO-2022201038 | A1 * | 9/2022 | G01N 27/624 |
| WO | WO-2022269517 | A1 * | 12/2022 | G01N 27/624 |
| WO | WO-2023119062 | A1 * | 6/2023 | H01J 49/24 |

OTHER PUBLICATIONS

Cumeras, R. et al., “Review on Ion Mobility Spectrometry. Part 1: Current Instrumentation”, Analyst, vol. 140, No. 5, Jan. 1, 2015, pp. 1376-1390.

Hager et al., Product ion scanning using a Q-q-Q linear ion trap (Q TRAP) mass spectrometer, Rapid Communications in Mass Spectrometry (2003; 17: 1056-1064).

Ieritano, Christina et al., “Determining Collision Cross Sections from Differential lon Mobility Spectrometry”, Analytical Chemistry, vol. 93, No. 25, Jun. 29, 2021, pp. 8937-8944.

Krylov et al., “Temperature effects in differential mobility spectrometry”, International Journal of Mass Spectrometry, Elsevier, vol. 279, No. 2-3, Jan. 15, 2009, pp. 119-125.

PCT International Preliminary Report on Patentability in International Application PCT/IB2022/055798, mailed Jan. 4, 2024, 9 pages.

PCT International Search Report and Written Opinion in International Application PCT/IB2022/055798, mailed Sep. 23, 2022, 17 pages.

Porta et al., “Gas-phase separation of Drugs and Metabolites using Modifier-Assisted Differentail lon Mobiliity Spectrometry Hyphenated to Liquid Extraction Surface Analysis and Mass Spectrometry”, Anal. Chem., 2013, 85, 24, 11771-11779.

Rajapaske et al., “Automated chemical identification and library building using dispersion plots for differentail mobility spectrometry”, Analytical Methods, vol. 10, No. 35, Jan. 1, 2018, pp. 4339-4349.

Schnedier et al., “DMS-MS Separations with Different Transport Gas Modifiers”, Int. J. Ion Mobile. Spec (2013) 16: 207-2016.

Schneider et al., “Chemical Effects in the Separation Process of a DMS/MS System”, Anal. Chem. 2010, 82, 1867-1880.

Schneider et al., “Differential Mobility Spectrometry/Mass Spectrometry History, Theory, Design Optimization, Simulations, and Applications”, Mass Spectrom Rev, 2016, 35(6): 687-737.

Wei et al., “Effects of Solvent Vapor Modifiers for the Separation of Opiod Isomers in Micromachined Faims-Ms”, J. Am. Soc. Mass Spectrom. (2019) 30: 731-742.

* cited by examiner

AUTOMATED SYSTEMS AND METHODS FOR SEPARATING COMPOUNDS

CROSS-REFERENCE TO RELATED APPLICATION

This application is a National Stage Application of PCT/IB2022/055798, filed on Jun. 22, 2022, which claims the benefit of U.S. Provisional Application No. 63/213,352, filed on Jun. 22, 2021, the entire disclosures of which are incorporated herein by reference in their entireties. To the extent appropriate, a claim of priority is made to each of the above disclosed applications.

BACKGROUND

Differential Mobility Spectrometers (DMS), also referred to as Field Asymmetric Waveform Ion Mobility Spectrometers (FAI-MS) or Field Ion Spectrometers (FIS), typically perform gas-phase ion sample separation and analysis by continuously transmitting ions-of-interest while filtering out unwanted species. In some circumstances, a DMS can be interfaced with a mass spectrometer (MS) to take advantage of the atmospheric pressure, gas-phase, and continuous ion separation capabilities of the DMS and the detection accuracy of the MS. By interfacing a DMS with an MS, numerous areas of sample analysis, including proteomics, peptide/protein conformation, pharmacokinetics, and metabolism analysis have been enhanced. In addition to pharmaceutical and biotech applications, DMS-based analyzers have been used for trace level explosives detection and petroleum monitoring. As a result, there is significant interest in optimizing DMS parameters to ensure that the best possible separation is achieved.

SUMMARY

In one aspect, the technology relates to a gas introduction system for a differential mobility spectrometer (DMS), the system including: a manifold including: a gas inlet; a gas outlet; a mixing channel fluidically coupling the gas inlet to the gas outlet; a plurality of modifier liquid supply inlets coupled to the mixing channel; and a plurality of selectively operable valves, wherein one of the plurality of selectively operable valves is coupled to one of the plurality of modifier liquid supply inlets; and a control system in communication with each of the plurality of the selectively operable valves, wherein the control system is configured to actuate each of the plurality of selectively operable valves. In an example, each of the plurality of the selectively operable valves is coupled to a discrete modifier source. In another example, each of the discrete modifier sources includes a modifier fluid source and a pump, and wherein the control system is in communication with each of the plurality of pumps and is configured to activate each of the plurality of pumps. In yet another example, the plurality of modifier liquid supply inlets includes three modifier liquid supply inlets. In still another example, the manifold includes a unitary body component.

In another example of the above aspect, the curtain gas introduction system includes a sensor disposed in the mixing channel.

In another aspect, the technology relates to a method of processing a sample in a differential mobility spectrometer (DMS), the method including: introducing the sample to the DMS while introducing a gas flow to a mixing channel of a manifold coupled to the DMS; selecting, by the DMS, a first subset of ions in the sample, based at least in part on the introduced sample and the introduced gas flow; while introducing the sample to the DMS and introducing the gas flow to the mixing channel of the manifold, sequentially introducing to the mixing channel a plurality of modifiers from each of a plurality of modifier sources; selecting, by the DMS, a plurality of different subsets of ions in the sample, based at least in part on the introduced sample, the introduced gas flow, and the plurality of modifiers; comparing the first subset of ions to at least one of the different subsets of ions; and based at least in part on the comparison, selecting one of (a) the curtain gas and (b) at least one of the plurality of modifiers. In an example, the method includes terminating introduction of a first modifier of the plurality of modifiers prior to introducing a second modifier of the plurality of modifiers to the mixing channel. In another example, the method further includes receiving information associated with the sample, wherein the information includes at least one of an analyte of interest, a mass of interest, and a sample of interest, and wherein the selection based on the comparison is associated with the received information. In yet another example, introducing the gas flow to the mixing channel includes introducing an uninterrupted flow of gas during introduction of each of the plurality of modifiers. In still another example, the method further includes determining an absence of a first modifier of the plurality of modifiers prior to introducing the second modifier of the plurality of modifiers to the mixing channel.

In another aspect of the above aspect, determining the absence of the first modifier is based at least in part on a gas flow rate, a modifier flow rate, a mixing channel volume, and a sensor signal. In an example, introducing the first modifier of the plurality of modifiers to the mixing channel includes actuating a valve and a pump associated with the modifier. In another example, introducing the plurality of modifiers includes introducing at least two modifiers simultaneously.

In another aspect, the technology relates to a system for processing a sample, the system including: a differential mobility spectrometer (DMS) including an inlet; a manifold coupled to the DMS, wherein the manifold includes a mixing channel; a gas source fluidically coupled to the mixing channel; a plurality of modifier sources fluidically coupled to the mixing channel; a processor; and memory storing instructions that, when executed by the processor, cause the system to perform operations including: introducing the sample of the DMS while introducing a gas flow from the gas source to the mixing channel; selecting, by the DMS, a first subset of ions in the sample, based at least in part on the introduced sample and the introduced gas flow; while introducing the sample to the DMS and introducing the gas flow to the mixing channel of the manifold, sequentially introducing to the mixing channel a plurality of modifiers from each of the plurality of modifier sources; selecting, by the DMS, a plurality of different subsets of ions in the sample, based at least in part on the introduced sample, the introduced gas flow, and the plurality of modifiers; comparing the first subset of ions to at least one of the different subsets of ions; and based at least in part on the comparison, selecting one of (a) the curtain gas and (b) at least one of the plurality of modifiers. In an example, sequentially introducing to the mixing channel a plurality of modifiers includes introducing a subsequent modifier to the mixing channel immediately after terminating flow of a first modifier to the mixing channel. In another example, sequentially introducing each of the plurality of modifiers includes actuating a valve and a pump associated with each of the plurality of modifier sources. In yet another example, the operations further includes: receiving information associated with the sample, wherein the information includes at least one of an analyte of interest, a mass of interest, and a sample of interest; and associating the selection based on the comparison with the received information. In still another example, the plurality of modifiers include three modifiers.

In another example of the above aspect, the system further includes a mass spectrometer (MS) downstream of the DMS, and wherein the operations further include analyzing an output of the DMS by the MS.

DETAILED DESCRIPTION

Figure 1:
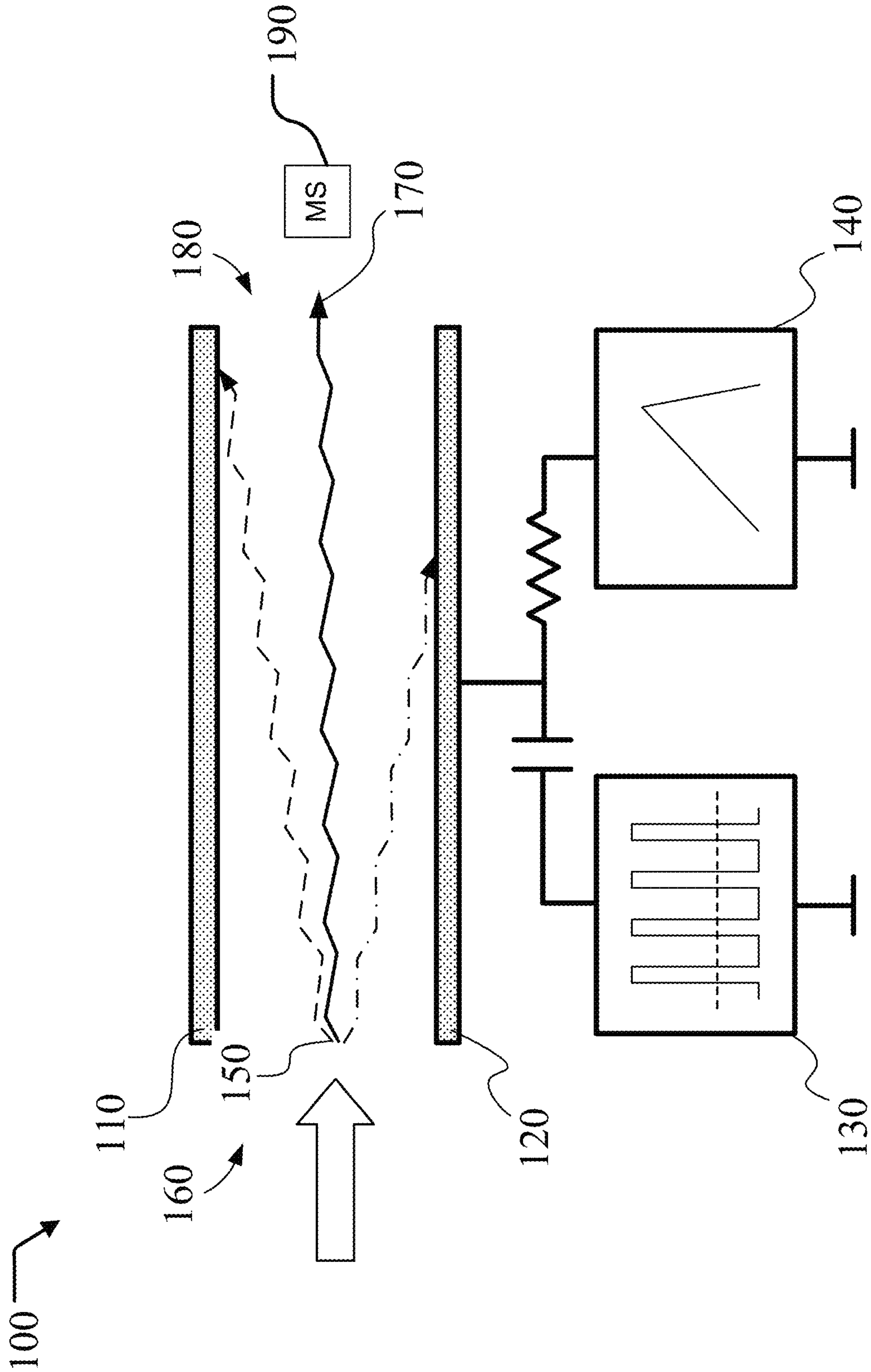
FIG. 1 is a schematic diagram of an exemplary differential mobility spectrometry (DMS) device.

FIG. 1 is a schematic diagram of an exemplary differential mobility spectrometer (DMS) device 100. DMS device 100 includes two parallel flat plates, plate 110 and plate 120. Radio frequency (RF) voltage source 130 applies an RF separation voltage (SV) between plate 110 and plate 120, and direct current (DC) voltage source 140 applies a DC compensation voltage (CoV) between plate 110 and plate 120. Ions 150 enter DMS device 100 in a transport or curtain gas at opening 160. Unlike traditional ion mobility, ions 150 are not separated in time as they traverse the device. Instead, ions 150 are separated in trajectory based on the difference in their mobility between the high field and low field portions of applied RF voltage source 130. The high field is applied between plate 110 and plate 120 for a short period of time, and then a low field is applied with the opposite polarity for a longer period of time. Any difference between the low-field and high-field mobility of an ion of a compound of interest causes it to migrate towards one of the plates. The ion is steered back towards the center-line of the device by the application of a second voltage offset, known as the CoV of DC voltage source 140, a compound-specific parameter that can be used to filter out other ions selectively. Rapid switching of the CoV allows the device 100 to monitor many different compounds concurrently. Ions 170 selected by the combination of SV and CoV leave DMS device 100 through opening 180 to the remainder of the mass spectrometer 190. DMS device 100 is located between an ion source device (not shown) and the remainder of the mass spectrometer 190, for example.

In general, DMS device 100 has two modes of operation. In the first mode, DMS device 100 is on, SV and CoV voltages are applied, and ions are separated. This is, for example, the enabled mode. In the second mode of operation, DMS device 100 is off, the SV is set to zero and ions 150 are simply transported from opening 160 to opening 180. This is, for example, the disabled or transparent mode of DMS device 100. In the enabled mode, DMS device 100 can acquire data for a single MRM transition in about 15-20 milliseconds (ms), for example, including an inter-scan pause time of about 10-15 ms. In transparent mode, the delay through DMS device 100 is negligible.

The normalized difference between an ion's high and low field mobility (shown in Equation 1) is referred to as the differential mobility function, or "alpha function" ($\alpha(E/N)$), $$\alpha\left(\frac{E}{N}\right) = \frac{K\left(\frac{E}{N}\right) - K(0)}{K(0)} \qquad \text{Equation 1}$$

where K(E/N) is the field-dependent ion mobility and K(0) is the low field ion mobility.

The efficacy of DMS separation can be enhanced by the addition of chemical modifiers. Chemical modifiers significantly change the alpha function of the analyzed ions. Compounds entering the DMS system form clusters with the chemical modifier, and this alters the mobility characteristics. Under low electric field conditions chemical modifiers cluster with ions, while under high electric fields these clusters decompose. This phenomenon is often referred to as the dynamic cluster/decluster model. The net effect of the dynamic cluster/decluster mechanism is that the differences between high- and low-field mobilities are amplified, yielding better separation power and increased peak capacity. Chemical modifiers that have been used to separate compounds, include for example, alcohols, 2-propanol, acetonitrile, methanol, water, cyclohexane, ethylacetate, acetone and combinations thereof.

DMS can be used to filter out impurities in complex mixtures to improve specificity for target chemicals. The ability to reduce chemical noise accelerated DMS integration into systems that rely on the sensitive detection of target chemicals. One system which has benefited from DMS integration is mass spectrometry (MS). MS is an analytical technique that measures the mass-to-charge ratio of ions by producing a mass spectrum, which is a plot of intensity as a function of the mass-to-charge ratio. This dual integrated system is assembled by attaching a DMS device to the inlet of a mass spectrometer. Isobaric separations take place between the DMS electrodes and separated compounds pass into the inlet of the MS for mass analysis. SCIEX has commercialized DMS-MS systems under the trade names SelexION technology and SelexION+ technology.

DMS-MS analysis has emerged as a significant development in the science industry. The utility of chemical modifiers to support DMS function to separate compounds have been discussed in a number of studies. For instance, Schneider, B. B., Covey, T. R., Nazarov, E. G., "DMS-MS separations with different gas modifiers", Int. J. Ion Mobil. Spec. (2013) 16:207-216 (DOI 10.1007/s12127-013-0130-8), the disclosure of which is hereby incorporated by reference herein in its entirety, provided systematic experimental data for a 140 chemical mixture in the presence and absence of a range of chemical modifiers. Schneider et al. illustrated (e.g., in FIG. 1 of Schneider et al.) the bulk separation of the 140 chemicals in mixture with and without the presence of isopropanol. While some overlap remained with the modifier, the spread over compensation voltage (CoV) was greatly enhanced with the modifier. The main conclusion of Schneider et al. was to demonstrate that different modifiers have different effect on compounds and it is more efficient when trying modifiers on a set of compounds to select modifiers with different effect, i.e. orthogonal modifiers, before trying modifiers with similar effect.

However, there has been difficulty recognized in separating certain interfering compounds, including isobaric compounds. For this reason, liquid chromatography-mass spectrometry (LC-MS) has remained the standard technique when required to distinguish between and separate similar compounds during analysis. An example of this problem arises in the field of clinical sample analysis where a panel of compounds, such as opioids or barbiturates, are being tested for. In conducting such tests, it is necessary to distinguish between different similar compounds as well as isobaric compounds that have the same composition but different structure. It has generally been understood that similar compounds, as well as isobaric compounds, are not always separable by DMS.

For example, Porta, T., Varesio, E., and Hopfgartner, G., "Gas-phase separation of Drugs and Metabolites using Modifier-Assisted Differential Ion Mobility Spectrometry Hyphenated to Liquid Extraction Surface Analysis and Mass Spectrometry, Anal. Chem., 2013, 85, 24, 11771-11779 (DOI: 10.1021/ac4020353), the disclosure of which is hereby incorporated by reference herein in its entirety, describe the use of modifiers to assist in separating certain isomeric metabolites. While the modifiers were successful in separating some of the compounds, they were not able to separate all of the isomeric metabolites (e.g. see FIG. 2 of Porta et al.).

Figure 7A:
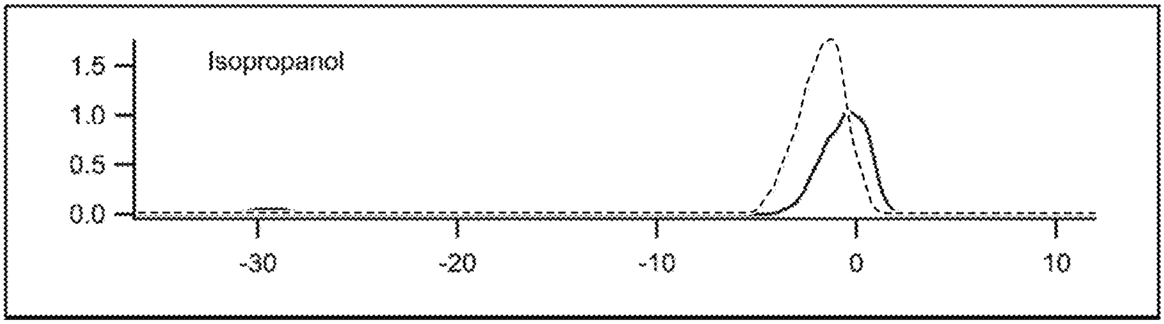
FIGS. 7A-7C depict separation of venlafaxine and imipramine using various transport gas conditions.
Figure 7B:
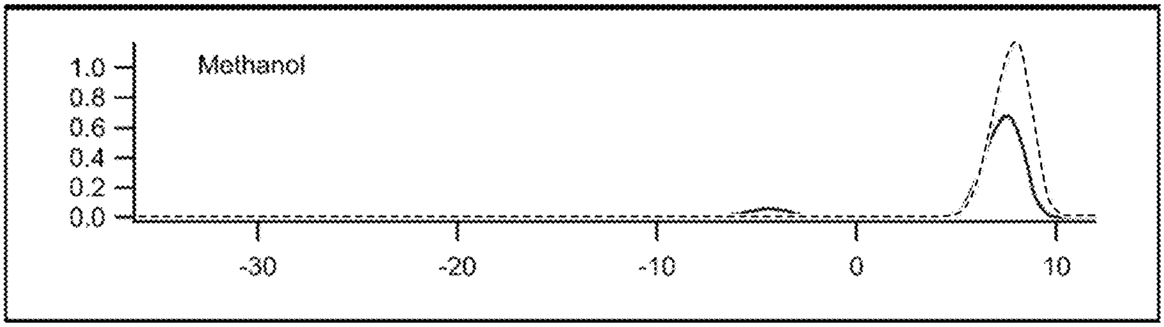

Similarly, the separability of hydromorphone, norcodeine, morphine, and codeine was reported in Wei, M. S., Kemperman, R. H. H., Yost, R. A., "Effects of Solvent Vapor Modifiers for the Separation of Opioid Isomers in Micromachined FAIMS-MS", J. Am. Soc. Mass Spectrom. (2019) 30:731-742 (DOI: 10.1007/s13361-019-02175-w, the disclosure of which is hereby incorporated by reference herein in its entirety. In Wei et al., the authors were able to demonstrate the separation of morphine and norcodeine using acetonitrile as a modifier, however they demonstrated the inability to separate morphine, hydromorphone and codeine to an analytically useful degree. Wei et al. demonstrates, e.g., in FIGS. 4*b* and 7, significant overlap between hydromorphone, morphine, and codeine, which indicates that neither an acetonitrile modifier nor an ethyl acetate modifier are capable of separating between all four of these compounds. The other modifiers demonstrated in Wei et al. showed even worse performance as compared with acetonitrile and ethyl acetate. Thus, while the problem with only being able to separate some of the isomeric compounds makes the system unsuitable for general analytical work where a sample of unknown composition is provided and the analysis results are expected to identify what compounds are in the sample.

Figure 2A:
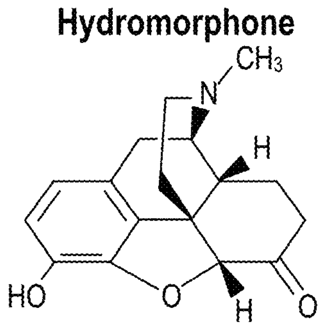
FIG. 2A-2C depict chemical structures of a group of isobaric opioid species: hydromorphone, norhydrocodone and morphine, respectively.
Figure 2B:
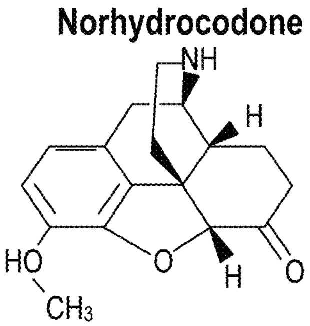
Figure 2C:
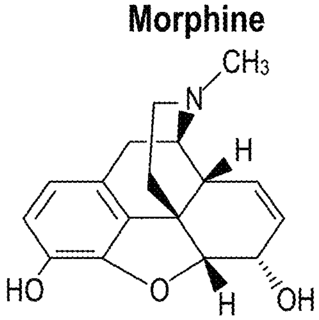
Figure 3:
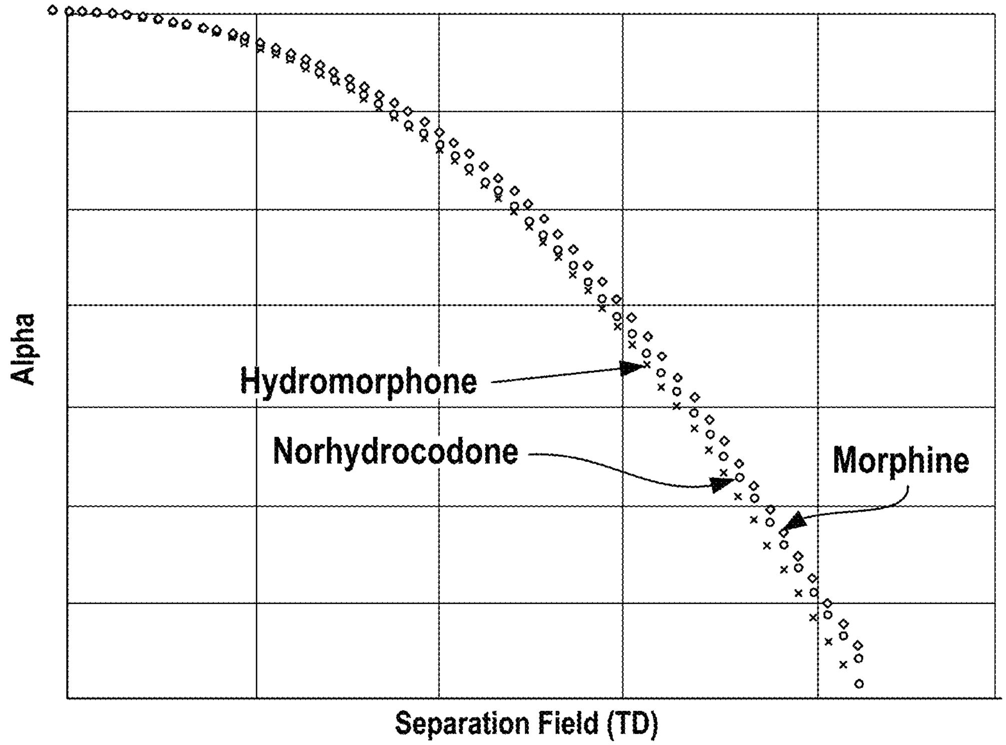
FIG. 3 depicts the alpha curves for the three species illustrated in FIGS. 2A-2C, in the absence of chemical modifiers.

As discussed above, although DMS devices allow for the separation of structural isomers and isobaric compounds, the determination of optimal conditions for separating species can still be a challenge. For large panels of compounds, there is no guarantee that a single chemical modifier can be sufficient to separate all compounds of interest. This can be particularly problematic for high throughput workflows such as flow injection analysis or acoustic ejection mass spectrometry (AEMS) using an open port interface (OPI), which do not include other separation means such as liquid chromatography. Under these conditions, there is a need to provide the ability for testing various different chemical modifiers, as well as means for high-speed switching between the different modifiers. FIGS. 2A-2C show structures for a first group of opioid compounds with very similar structures; hydromorphone, norhydrocodone, and morphine. FIG. 3 shows the alpha curves for these three species in the absence of chemical modifiers. As discussed above, alpha represents the normalized difference between the high and low field mobility for an ion. Two species are generally considered separable when the difference in alpha is greater than about 0.005. As shown in FIG. 3, the alpha curves are very similar for hydromorphone, norhydrocodone, and morphine, such that it is not possible to baseline separate them.

Figure 4A:
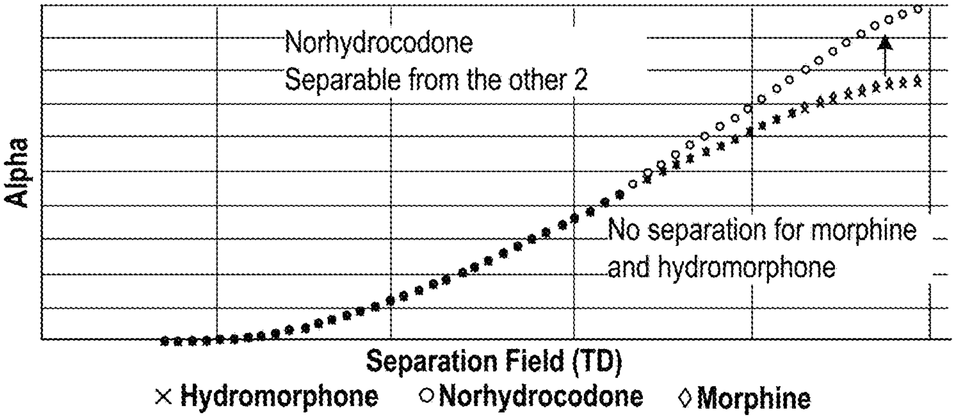
FIGS. 4A-4C depict alpha curves for the three isobaric opioid species of FIGS. 2A-2C in the presence of isopropanol, acetonitrile and ethylacetate modifiers, respectively.
Figure 4B:
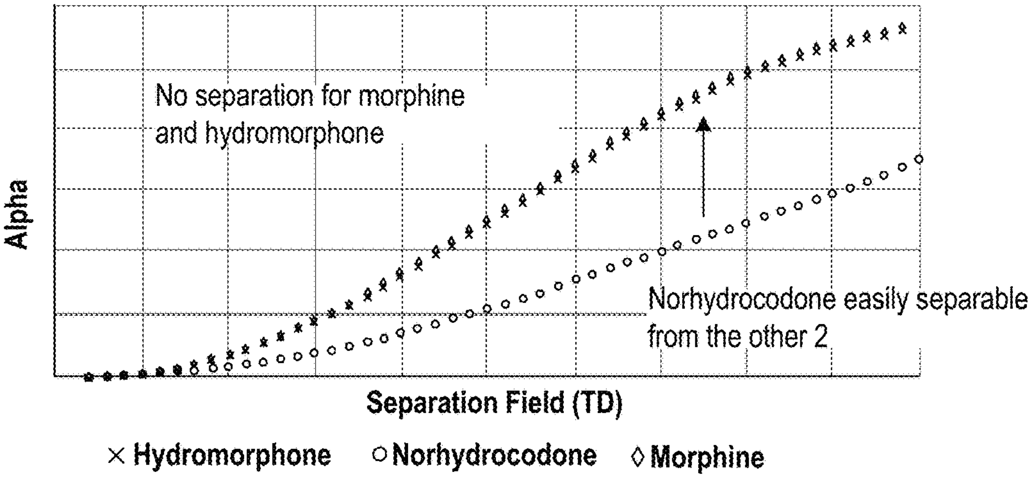
Figure 4C:
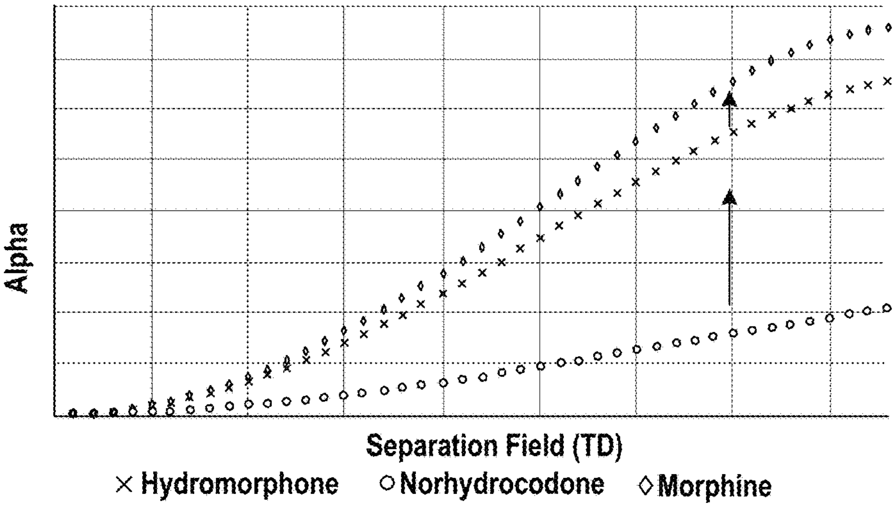

FIG. 4A depicts the alpha curves for hydromorphone, norhydrocodone, and morphine when isopropanol is added to the transport gas. It will be noted that the alpha curve for norhydrocodone is substantially different than the curves for the other isobars, indicating that norhydrocodone may be baseline separated from hydromorphone and morphine whereas morphine and hydromorphone are not separated with the addition of isopropanol. Similar results are shown in FIG. 4B, using acetonitrile as the modifier. In FIGS. 4A and 4B, it is apparent that neither isopropanol nor acetonitrile are suitable for high speed screening of these three compounds using AEMS devices, due to lack of separation of morphine and hydromorphone. FIG. 4C shows alpha curves for the same group of compounds with the addition of an acetate modifier (ethylacetate), indicating sufficient alpha difference may be present to achieve baseline separation of all three species.

Figure 5A:
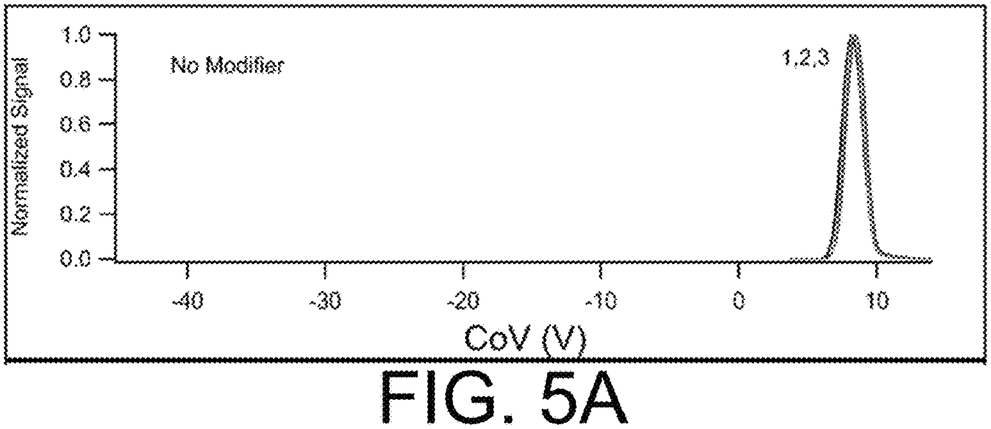
FIGS. 5A-5D depict ionogram separation data taken for a mixture of hydromorphone, norhydrocodone and morphine using various transport gas conditions.
Figure 5B:
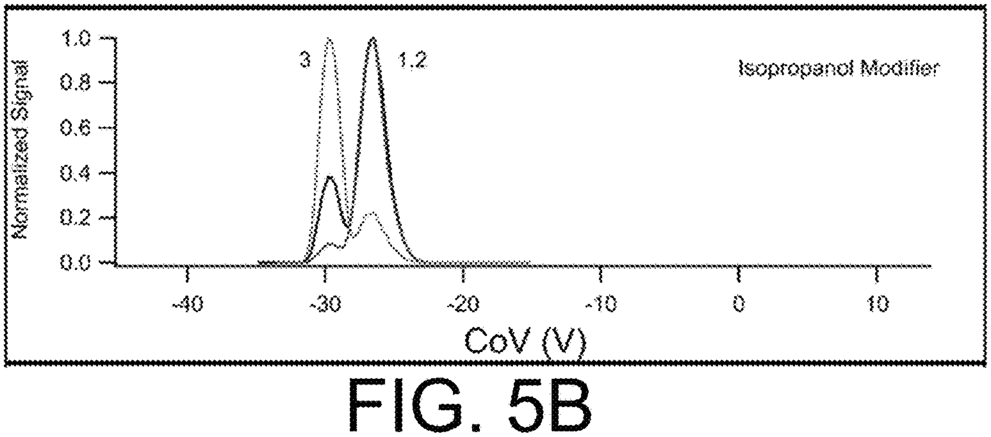
Figure 5C:
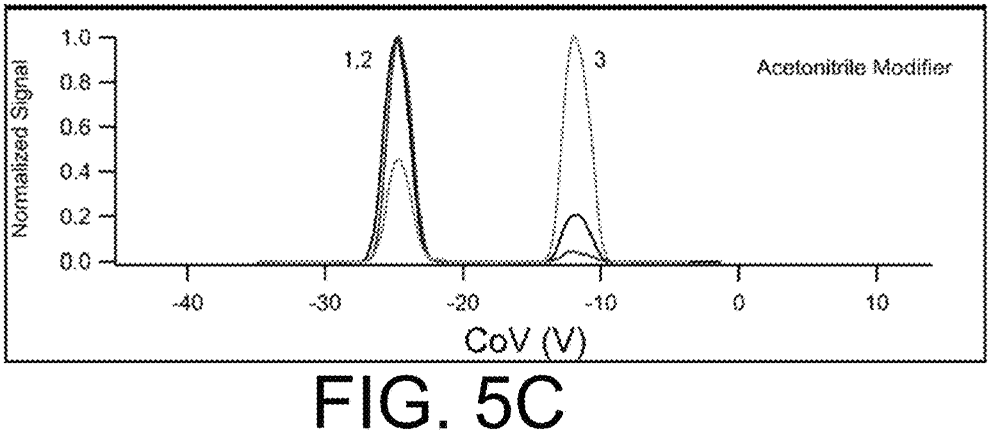
Figure 5D:
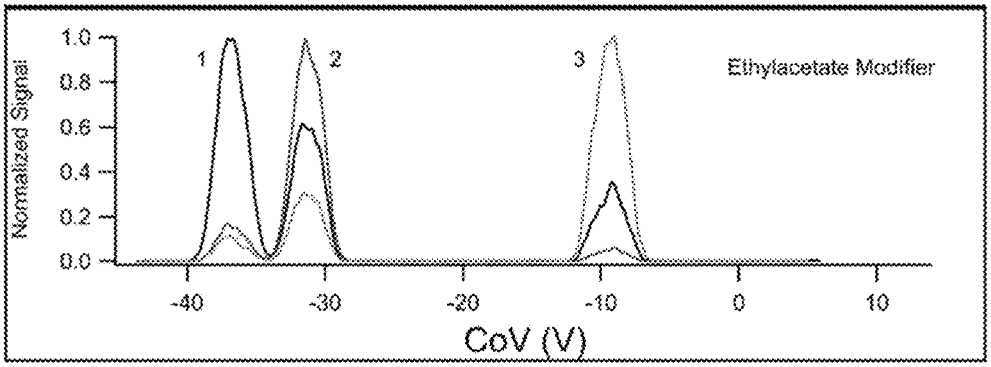

FIGS. 5A-5D shows ionogram separation data taken for a mixture of hydromorphone, norhydrocodone and morphine using various transport gas conditions. The structural isomers are labeled in FIGS. 5A-5D as 1) Morphine, 2) Hydromorphone, and 3) Norhydrocodone, and are shown separated under different DMS transport gas conditions. The transport gas conditions for the ionograms of include nitrogen (FIG. 5A), nitrogen with 1.5% isopropanol modifier (FIG. 5B), nitrogen with 3% acetonitrile (FIG. 5C), and nitrogen with 3% ethylacetate (FIG. 5D). Comparing FIGS. 5A-5D, it is apparent that only the nitrogen with 3% ethylacetate condition (as depicted in FIG. 5D) provides baseline separation of all three of the opioids.

Figure 6A:
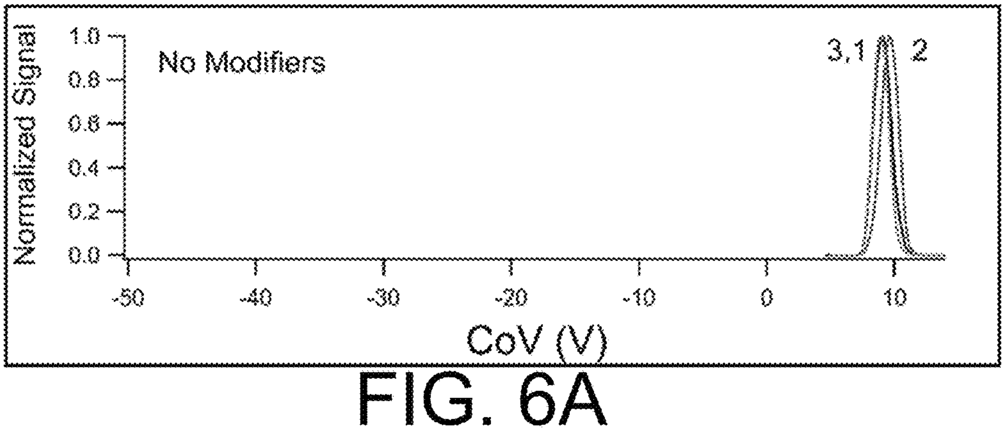
FIGS. 6A-6D depict ionogram separation data taken for oxymorphone, dihydrocodeine, and noroxycodone using various transport gas conditions.
Figure 6B:
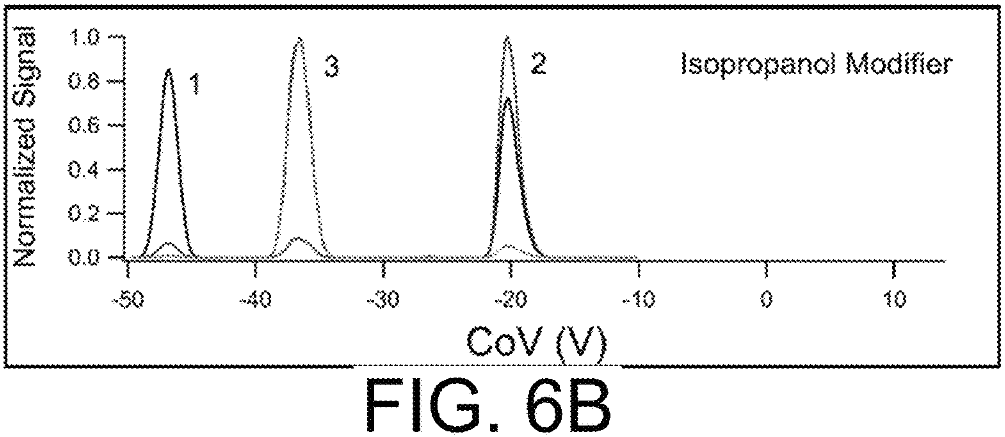
Figure 6C:
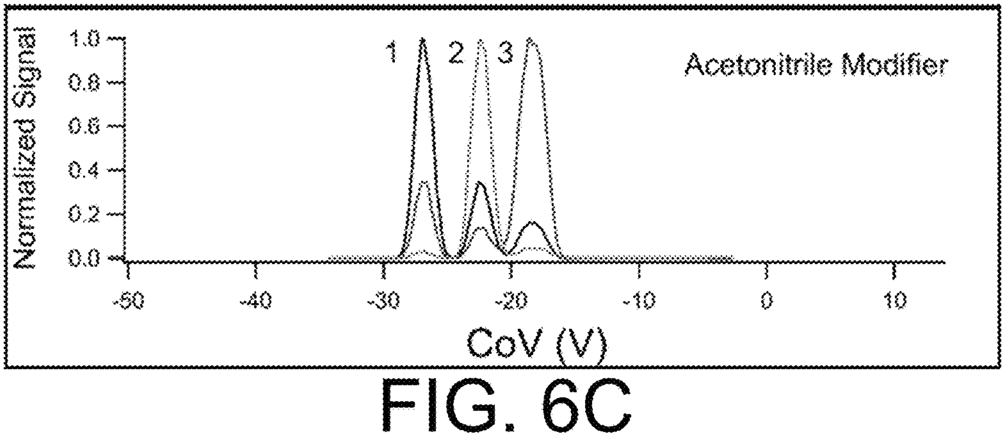
Figure 6D:
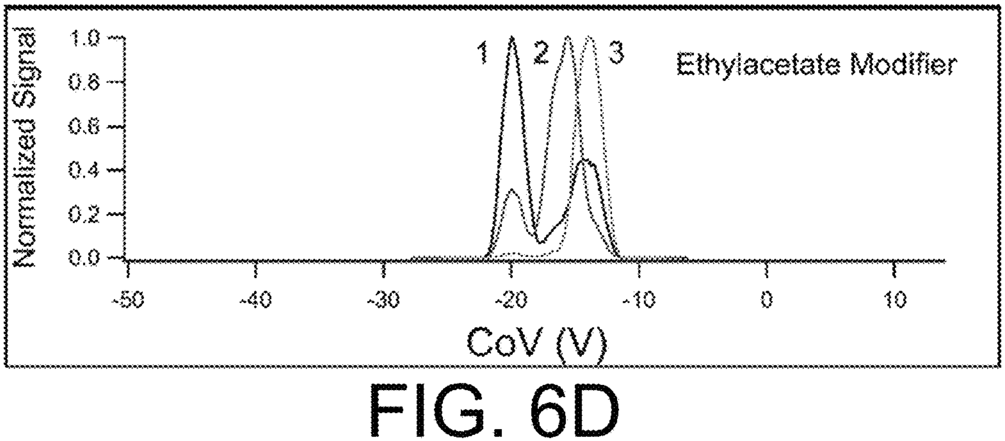

FIGS. 6A-6D show examples of ionogram separation data taken for a different group of opioids, comprising oxymorphone, dihydrocodeine, and noroxycodone. The structural isomers are labeled in FIGS. 5A-5D as 1) Oxymorphone, 2) Dihydrocodeine, and 3) Noroxycodone and are shown separated under different DMS transport gas conditions. Similar to the data of FIGS. 5A-5D, the three structural isomers were not separated in the absence of chemical modifiers (FIG. 6A). However, unlike the data of FIGS. 5A-5D, the best separation for the opioid mixture of was generated using nitrogen with isopropanol modifier (comparing FIG. 6B to FIGS. 6C and 6D). Comparing the data of FIGS. 5A-5D and 6A-6D, it is apparent that the use of a single modifier for analysis of a large panel of opioids would provide compromised separation of at least some of the compounds. Maximum selectivity for the entire panel requires the use of at least two different modifiers.

Figure 7C:
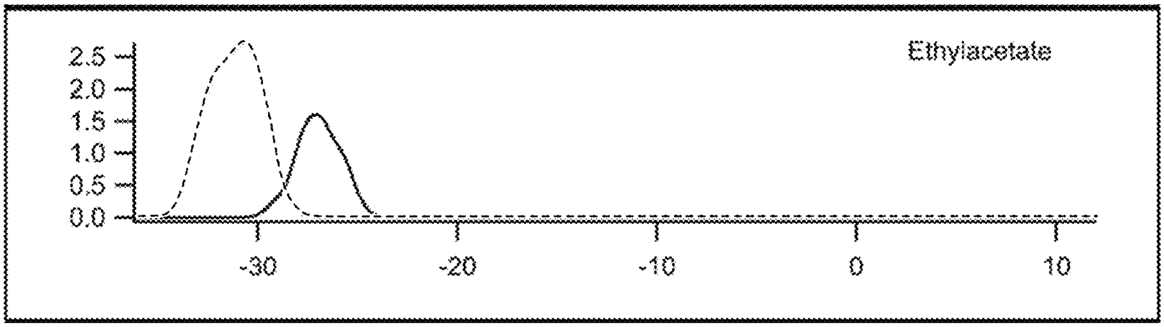

The examples of FIGS. 5A-5D and 6A-6D show separations that can be optimized with either isopropanol or ethylacetate modifiers. Other compound sets may require different chemical modifiers to fully optimize separations. An example of this is provided in FIGS. 7A-7C for separation of venlafaxine (black trace) and imipramine (grey trace) using various transport gas conditions. The alcohol modifiers, isopropanol (FIG. 7A) and methanol (FIG. 7B) did not provide separation of venlafaxine and imipramine. Partial separation was achieved with an ethylacetate modifier (FIG. 7C). The examples of FIGS. 5A-5D, 6A-6D, and 7A-7C demonstrate that the addition of chemical modifiers to the DMS transport gas provides chemical selectivity to DMS separations, and baseline separation for large panels may require providing a range of different chemical modifiers.

In addition to separating large panels of compounds, it can also be desirable to select different chemical modifiers to maximize ion transmission. An example is provided in FIGS. 8A and 8B, which depict separation of ketamine and sulfadiazine using nitrogen with acetone modifier and nitrogen with methanol modifier, respectively.

Figure 8A:
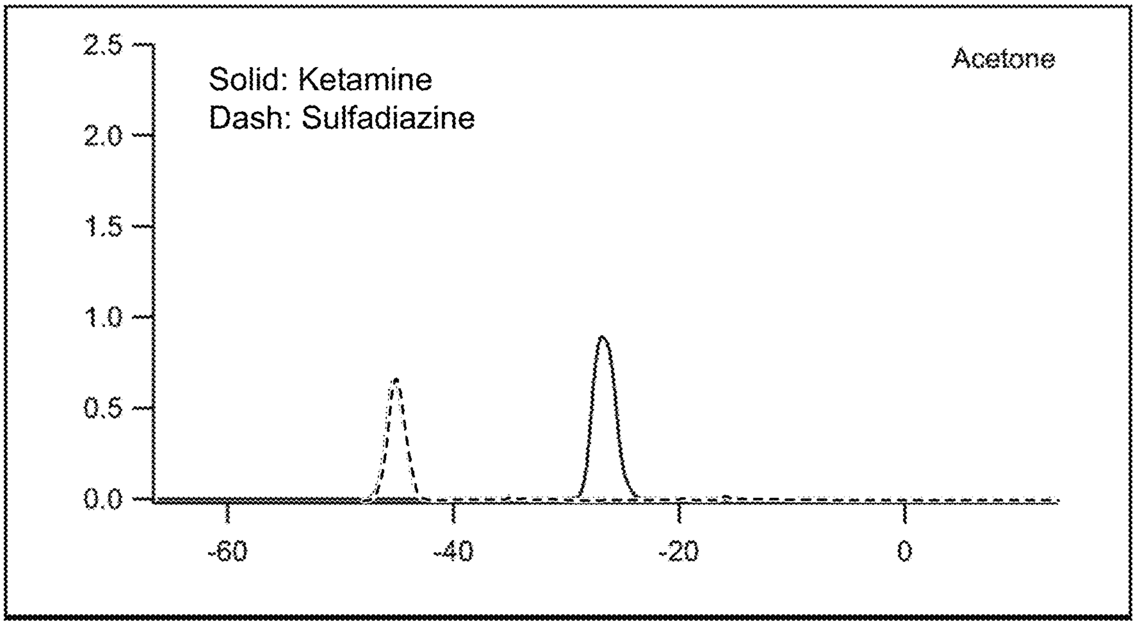
FIGS. 8A and 8B depict separation of ketamine and sulfadiazine using nitrogen with acetone modifier and nitrogen with methanol modifier, respectively.
Figure 8B:
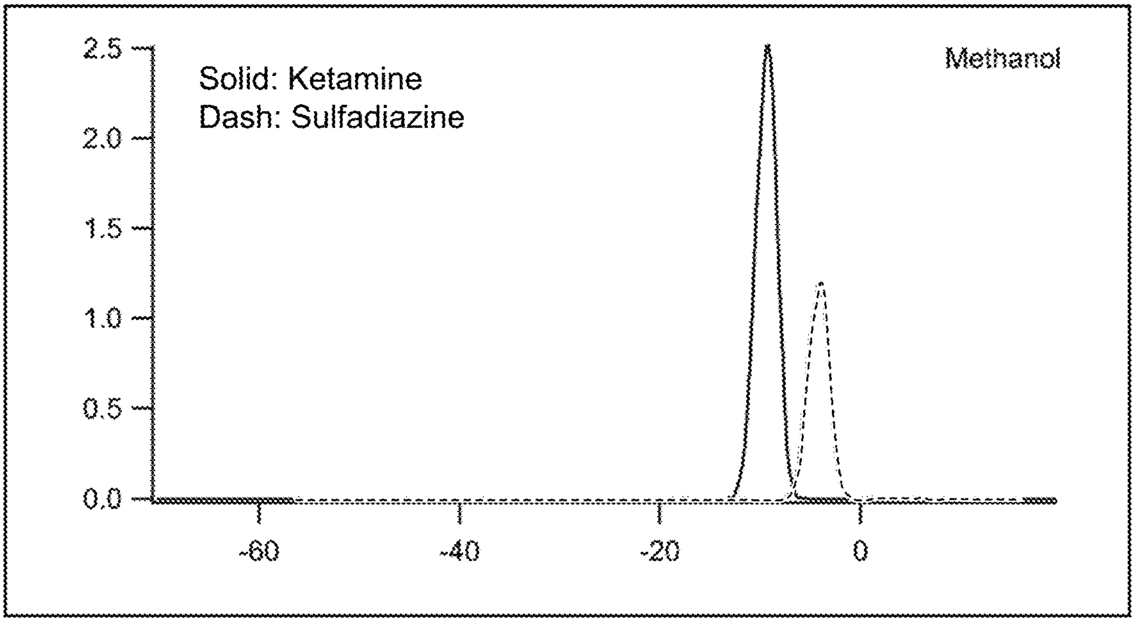

As demonstrated in FIG. 8A, an acetone modifier provides the best separation for these two compounds, with CoV spread on the order of 18 V. The separation with methanol modifier depicted in FIG. 8B was substantially smaller (7-8 V spread). Either modifier provided the ability to achieve baseline separation for these compounds, however, the peak intensity was 2-2.5× higher when using methanol as the modifier. Depending upon the sensitivity and LOQ requirements for this assay, it can be beneficial to compromise on the DMS separation to achieve better transmission, and the relationship between separation and transmission will differ for each assay and chemical modifier.

The technologies described herein include a method and apparatus for separating compounds and isobaric species of interest comprising opioids or benzodiazepines in a differential mobility spectrometer/mass spectrometer system. These separations may be performed automatically, by introducing a plurality of modifiers to a curtain gas flow, in an effort to separate an ionized sample. In examples, a series of modifiers may be introduced sequentially. In other examples, multiple modifiers may be introduced simultaneously. The DMS automatically selects a subset of the sample ions for each introduced modifier (or modifiers, if plural modifiers are introduced simultaneously). The subsets of ions are compared and the subset indicating the best separation of ions is identified. The modifier associated with that best subset is then selected and stored, e.g., as the preferred modifier for separating similar samples in the future. In another example, multiple samples may be introduced sequentially with a first modifier, then a second modifier, and so on. This may be desirable if there are two isobars to separate, where infusing the samples separately will provide a closer assessment of the DMS behavior for each.

Figure 9:
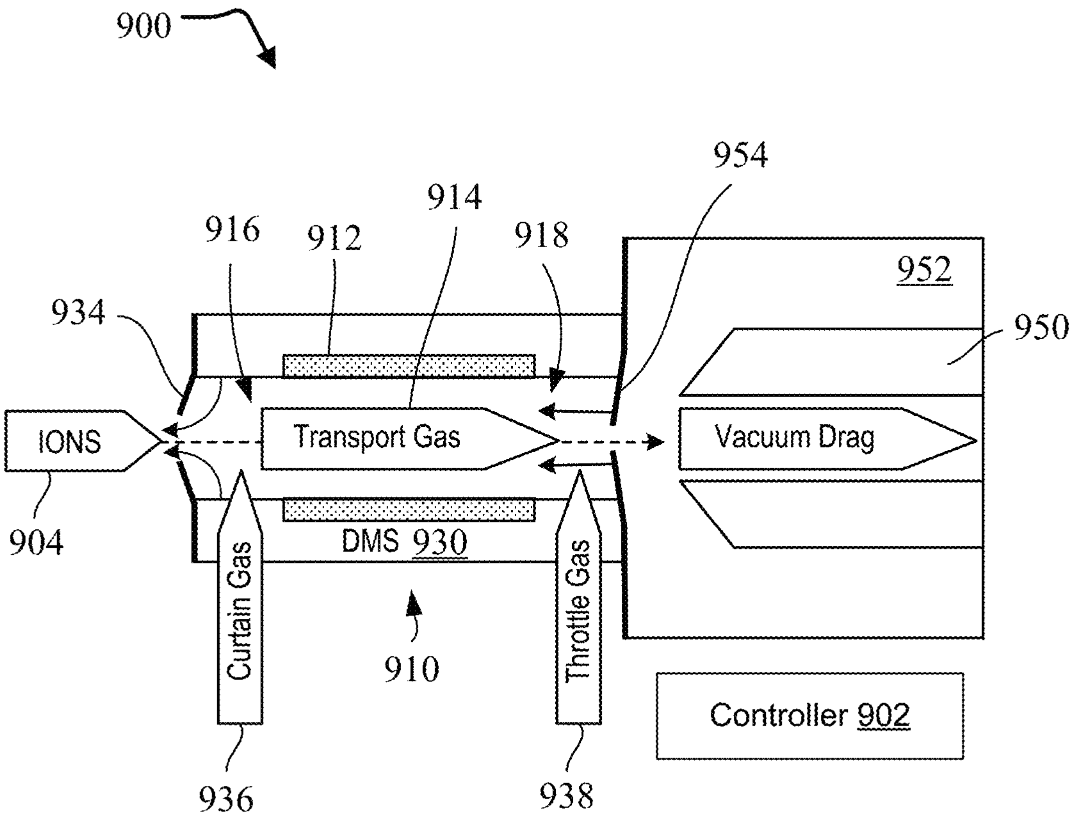
FIG. 9 depicts a schematic view of an automated differential mobility spectrometer and mass spectrometer (DMS-MS) system.

FIG. 9 depicts a schematic view of an automated DMS-MS system 900. Generally, the DMS-MS 900 performs gas-phase ion sample separation, detection, and analysis by continuously transmitting ions-of-interest while filtering out unwanted species. The controller 902 facilitates the automated methods of operating the DMS-MS 900 to separate compounds. The DMS-MS 900 generally comprises a DMS 910 in fluid communication with a first vacuum lens element of a mass spectrometer 950. It should be noted that the DMS-MS 900 represents only one possible configuration for use in accordance with various aspects of the systems, devices, and methods described herein.

The DMS 910 can have a variety of configurations, but is generally configured to resolve ions 904 based on their mobility through a fixed or variable electric field (whereas the mass spectrometer 950 analyzes ions based on their mass-to-charge ratios). In the DMS 910, radio frequency (RF) voltages, often referred to as separation voltages SV, can be applied across the drift tube in a direction perpendicular to that of a drift gas flow. Ions of a given species tend to migrate radially away from the axis of the transport chamber by a characteristic amount during each cycle of the RF waveform due to differences in mobility during the high field and low field portions. A DC potential, commonly referred to as a CoV, applied to the DMS cell provides a counterbalancing electrostatic force to that of the SV. The CoV can be tuned so as to preferentially prevent the drift of a species of ion of interest. Depending on the application, the CoV can be set to a fixed value to pass only ion species with a particular differential mobility while the remaining species of ions drift toward the electrodes and are neutralized. Alternatively in another application, if the CoV is scanned for a fixed SV as a sample is introduced continuously into the DMS 910, a mobility spectrum can be produced as the DMS 910 transmits ions of different differential mobilities.

In the example depicted in FIG. 9, the DMS 910 is contained within a curtain chamber 930 that is defined by a curtain plate or boundary member 934 and is supplied with a curtain gas 936 from a curtain gas supply (not shown). As shown in FIG. 2, the exemplary DMS 910 includes a pair of opposed electrode plates 912 that surround a transport gas 914 that drifts from an inlet 916 of the DMS 910 to an outlet 918 of the DMS 910. The outlet 918 of the DMS 910 releases the transport gas 914 into an inlet 954 of a vacuum chamber 952 containing the mass spectrometer 950. A throttle gas 938 can additionally be supplied at the outlet 918 of the DMS 910 so as to modify the flow rate of transport gas 914 through the DMS 910.

In accordance with certain aspects of the disclosure, the curtain gas 936 and throttle gas 938 can be set to flow rates determined by a flow controller and valves so as to alter the drift time of ions within the DMS 910. Each of the curtain gas 936 and throttle gas 938 supplies can provide the same or different pure or mixed composition gas to the curtain chamber 930. By way of non-limiting example, the curtain gas 936 can be air, $O_2$, He, $N_2$, $CO_2$, other inert gases, or any combinations thereof. The pressure of the curtain chamber 930 can be maintained, for example, at or near atmospheric pressure (i.e., 760 Torr). Additionally, the DMS 910 can include a chemical modifier supply (not shown) for supplying a chemical modifier and/or reagent to the curtain gas 936 and/or the throttle gas 938. It should be noted that the modifier supply can be a reservoir of a solid, liquid, or gas through which the curtain gas 936 is delivered to the curtain chamber 930. By way of example, the curtain gas 936 can be bubbled through a liquid modifier supply. Alternatively, a modifier liquid or gas can be metered into the curtain gas 936, for example, through an LC pump, syringe pump, or other dispensing devices for dispensing the modifier into the curtain gas at a known rate. For example, the modifier can be introduced using a pump so as to provide a selected concentration of the modifier in the curtain gas. The modifier supply can provide any modifier including, by way of non-limiting example, water, methanol, acetone, isopropanol, methylene chloride, methylene bromide, dimethyl sulfoxide, acetonitrile, any other liquid species capable of clustering with ions of interest, or any combination thereof.

The chemical modifier can interact with the ionized analytes (e.g., via a charged site in the compound) such that various analytes differentially interact with the modifier during the high and low field portions of the SV, thereby affecting the CoV needed to counterbalance a given SV. In some cases, this can increase the separation between analytes. Specifically, the chemical modifier can interact with the charged site in the isomeric molecules depending on the location of functional groups (e.g., electron donating group, electron withdrawing group). Examples of steric effects include, for example, the blockage of a charged site within the analyte, thereby altering the analytes drift through the DMS 910 during the high and/or low portions of the SV. As further disclosed herein, the identity of an analyte's functional group and its location can affect the interaction of a chemical modifier with the compound in the DMS 910, thus also affecting CoV.

Ions 904 (e.g., ionized analytes) can be generated by an ion source (not shown) and emitted into the curtain chamber 930 via curtain chamber inlet. The ion source can be virtually any ion source known in the art, including for example, an electrospray ionization (ESI) source. The flow of the curtain gas 936 in the curtain chamber 930 (e.g., approximately 760 Torr) can provide both a curtain gas outflow out of curtain chamber inlet, as well as a curtain gas inflow into the DMS 910, which inflow becomes the transport gas 914 that carries the ions 904 through the DMS 910 and into the mass spectrometer 950 contained within the vacuum chamber 952, which can be maintained at a much lower pressure than the curtain chamber 930. By way of non-limiting example, the vacuum chamber 952 can be maintained at a pressure lower than that of the curtain chamber 930 (e.g., by a vacuum pump) so as to drag the transport gas 914 and ions 904 entrained therein into the inlet 954 of the mass spectrometer 950. Though not shown, the sample(s) containing the analytes of interest can be delivered to the ion source 904 from a variety of sample sources, including through direct injection, pumping from a reservoir containing a fluid sample, flow injection analysis, and via a liquid chromatography (LC) column, by way of non-limiting examples.

The DMS-MS 900 may additionally include one or more additional mass analyzer elements downstream from vacuum chamber 952. Ions 904 can be transported through vacuum chamber 952 and through one or more additional differentially pumped vacuum stages containing one or more mass analyzer elements. For instance, in one embodiment, a triple quadrupole mass spectrometer may comprise three differentially pumped vacuum stages, including a first stage maintained at a pressure of approximately 2.3 Torr, a second stage maintained at a pressure of approximately 6 mTorr, and a third stage maintained at a pressure of approximately $90^{-5}$ Torr. The third vacuum stage can contain a detector, as well as two quadrupole mass analyzers with a collision cell located between them. It should be noted that there may be a number of other ion optical elements in the system. Alternatively, a detector (e.g., a Faraday cup or other ion current measuring device) effective to detect the ions 904 transmitted by the DMS 910 can be disposed of directly at the outlet of the DMS 910. It should be noted that the mass spectrometer 950 employed could take the form of a quadrupole mass spectrometer, triple quadrupole mass spectrometer, time-of-flight mass spectrometer, FT-ICR mass spectrometer, or Orbitrap mass spectrometer, all by way of non-limiting example.

Figure 10:
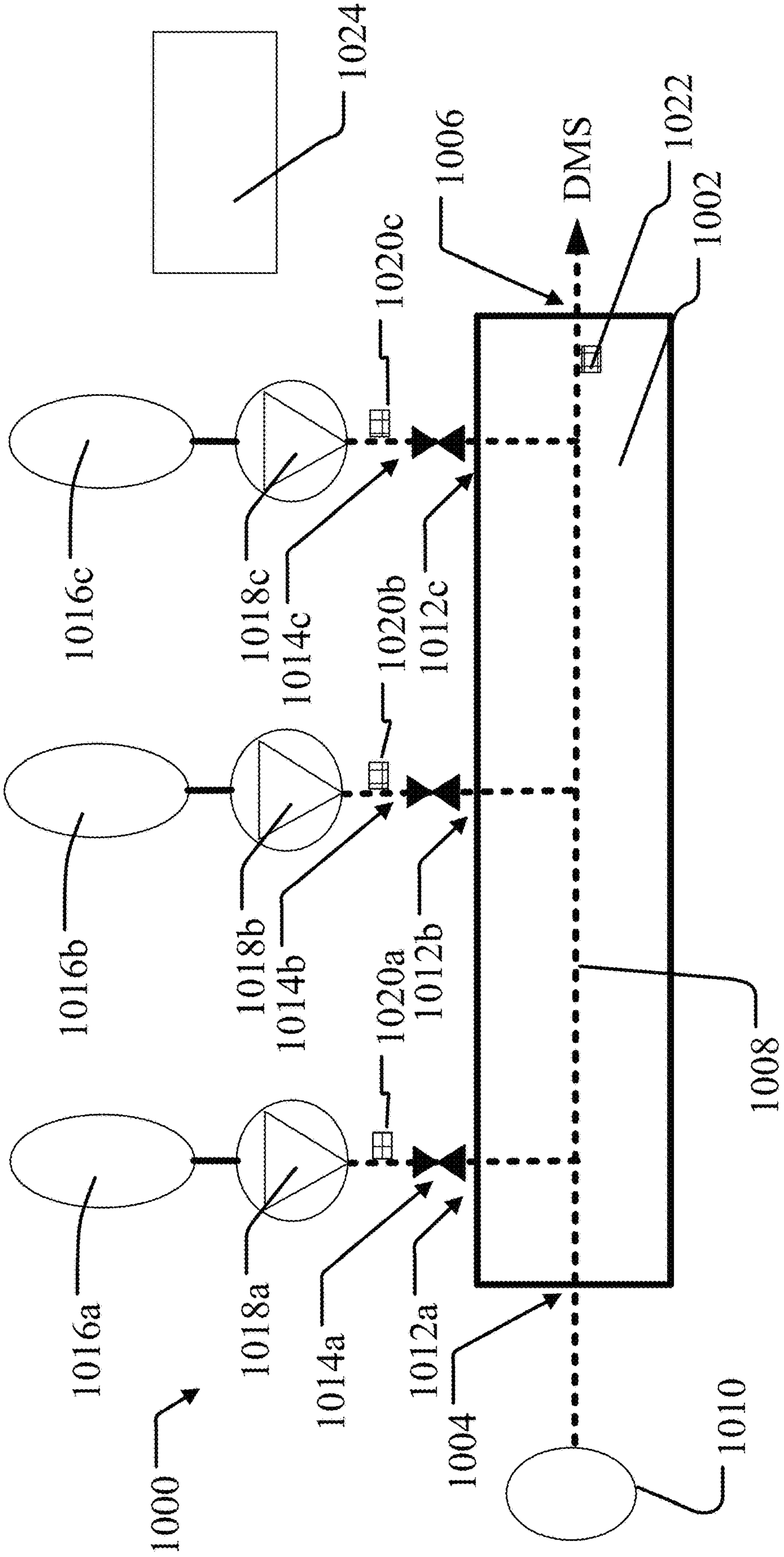
FIG. 10 depicts an example of a modifier manifold system for use with a DMS-MS system.

FIG. 10 depicts an example of a modifier manifold system 1000 for use with a DMS-MS system, such as depicted in FIG. 9. The manifold system 1000 includes a manifold body 1002, which may be a machined unitary component that defines the various channels, ports, inlets, outlets, and other features described herein. For example, the body 1002 defines a curtain or transport gas inlet 1004 and an outlet 1006; a mixing channel 1008 is defined therebetween and fluidically coupled to both, as well as to other channels as described further herein. The curtain gas inlet 1004 is fluidically coupled to a source 1010 of curtain gas. A plurality of modifier liquid supply inlets 1012 are also defined by the manifold body 1002. A control valve 1014 is disposed proximate each inlet 1012, and is used to selectively control the flow of a fluid modifier into the inlet 1012. Each modifier (examples of which are described elsewhere herein) is delivered from a modifier reservoir 1016 to its associated inlet 1012 via a pump 1018. Here, three modifier sources 1016*a*, 1016*b*, 1016*c* are depicted, along with associated components (differentiated by an identical suffix in FIG. 10). In examples, a greater or lesser number of modifiers may be utilized, although three modifiers (e.g., isopropanol, acetonitrile, and ethylacetate) have been determined to provide acceptable results across a wide range of compounds to be separated. Each pump 1018 also has associated therewith a flow sensor 1020, for detecting any flow or fail conditions. One or more detectors 1022, which may be optical, liquid, pressure, or other detectors may be disposed in communication with the mixing channel 1008. The detector(s) 1022 may detect one or more flow conditions within the manifold and/or may detect the presence or absence of a modifier, curtain gas, etc. Such detection may be indicative of one or more of the modifiers valves 1014 failing to properly close, a loss of curtain gas pressure, etc. A controller 1024, which may be the controller used to otherwise control the operation of a DMS-MS system (such as depicted in FIG. 9) may control operation of the various valves 1014 or pumps 1018, process signals sent from the flow sensors 1020 and the detectors 1022, and perform other controls as required or desired for a particular operation. From the outlet 1006, curtain gas, or curtain gas mixed with at least one modifier, may be delivered to the DMS, wherein it is processed along with an ionized sample introduced thereto. The system may also include downstream means for heating the curtain gas, a modifier liquid, or vapor. The heaters may be located anywhere in the DMS-MS system or along the preceding transport tubes. In one embodiment, the curtain chamber (830 in FIG. 8) may include a heat exchanger for vaporizing the modifier and heating the curtain gas/transport gas.

One benefit of the manifold system illustrated in FIG. 10 over prior art systems is the ability to rapidly switch the chemical modifier solvent. There are currently two commercial DMS systems that include components for chemical modifier delivery (SCIEX SelexION and SCIEX SelexION+). Both of these systems include a manifold with single liquid modifier inlet on the curtain gas line and a pump mounted distant from the manifold. Currently switching between modifiers requires purging the line from the modifier reservoir, through the pumping device, and then through the lines down to the manifold. With the prior art hardware, this can take between 10 and 20 min for switching. The device illustrated in FIG. 10 dramatically reduces modifier switching time because it eliminates the need for line purging between the modifier reservoirs and the manifold. The presence of three valves on the mixing chamber as well as three upstream pumps provides near instantaneous onset for modifier mixing and shut off. This is particularly important for high throughput systems where the goal is analysis of large numbers of samples.

Figure 11A:
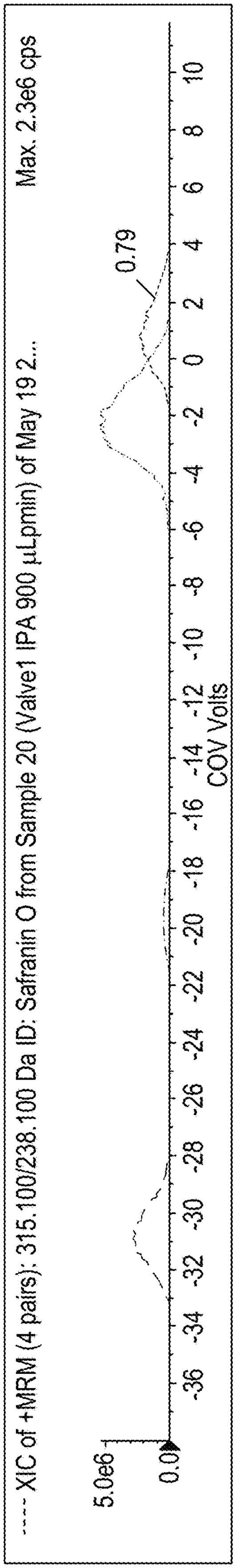
FIGS. 11A-11C depict separation data generated with a 3-way manifold.
Figure 11B:
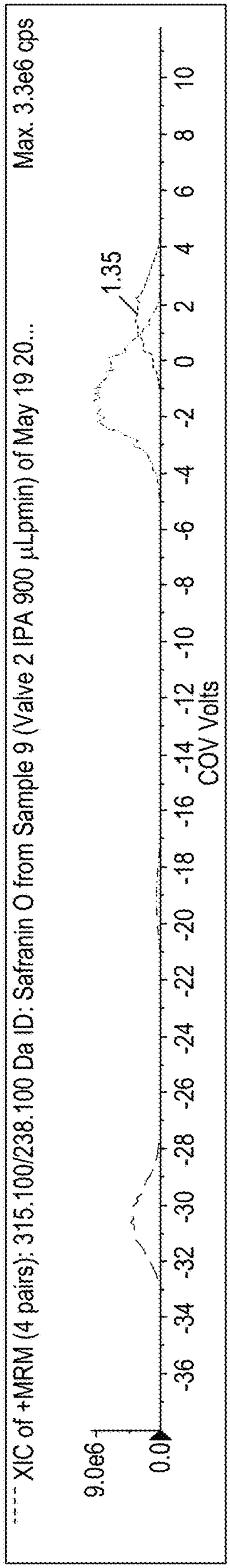
Figure 11C:
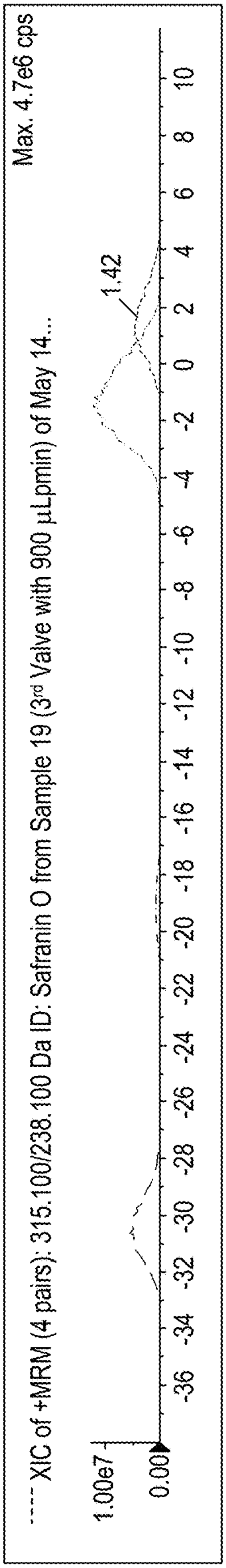

FIGS. 11A-11C depict separation data generated with a 3-way manifold, such as depicted in FIG. 10, and show that similar separations are achieved for a 4-compound mixture when added a fixed modifier (IPA) through any of the three ports in the manifold. Separation of 4 compounds (clenbuterol, morphine, safranin orange, and haloperidol) using nitrogen transport gas with 1.5% isopropanol added through port number 1 (FIG. 11A), 2 (FIG. 11B), and 3 (FIG. 11C).

Figure 12:
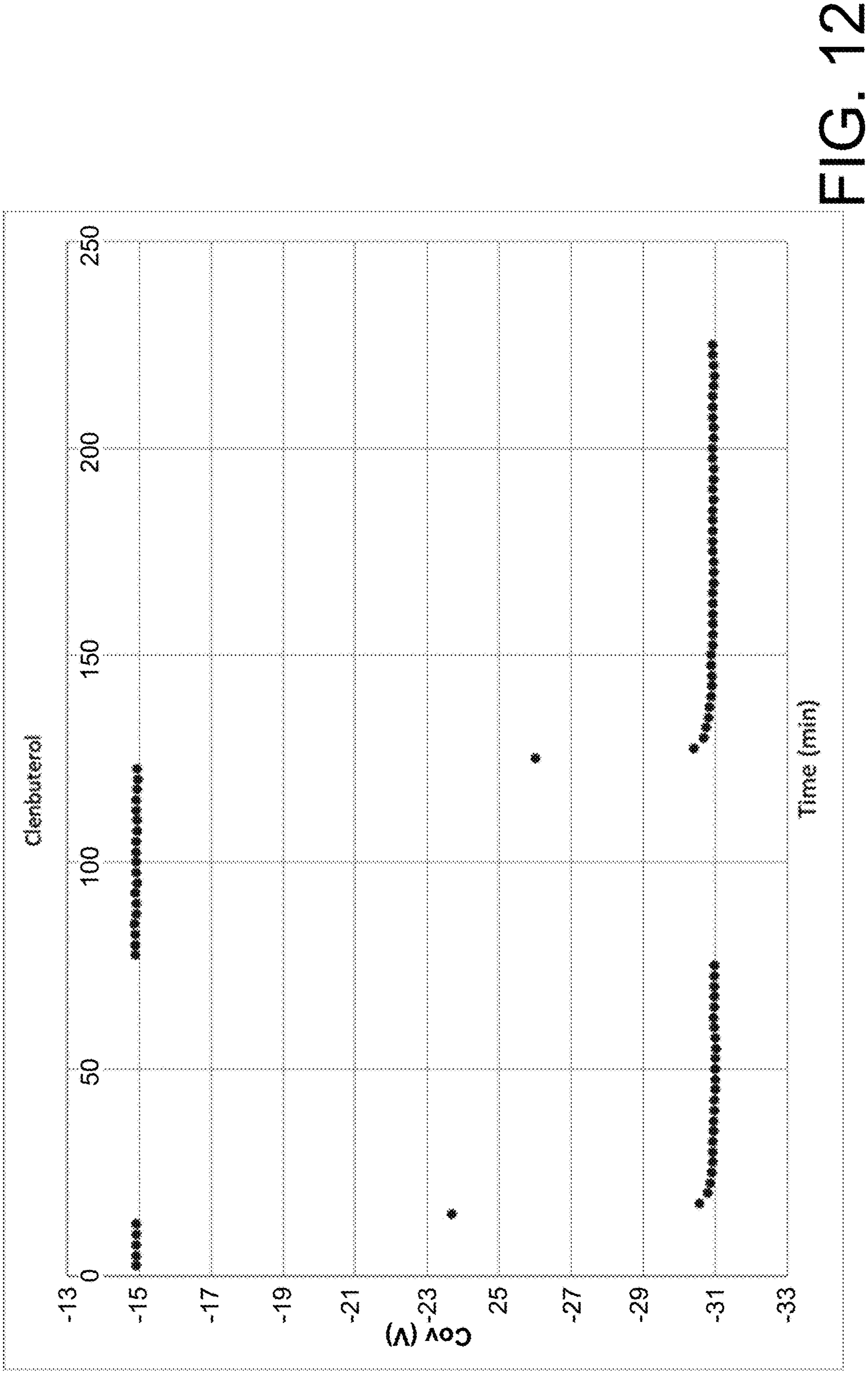
FIG. 12 depicts shows switching times for the sample clenbuterol using a 3-way manifold.

FIG. 12 depicts switching times for the sample clenbuterol using the 3-way manifold. More specifically, FIG. 12 depicts modifier switching results for clenbuterol using isopropanol and acetonitrile modifier. Initially the modifier was acetonitrile and the CoV was approximately −15 V. At approximately time 15 min, the modifier valve for acetonitrile was closed and IPA was pumped in as the modifier. Full stabilization of the CoV to the new value (approximately −31 V), required approximately 2-3 ramps (approximately 5-7.5 min). The modifier was switched back and forth to IPA and acetonitrile one additional time. The time to equilibrate the CoV position back to the acetonitrile value (−15 V) was less than 2.5 min, and this represents an order of magnitude improvement over current devices.

Figure 13:
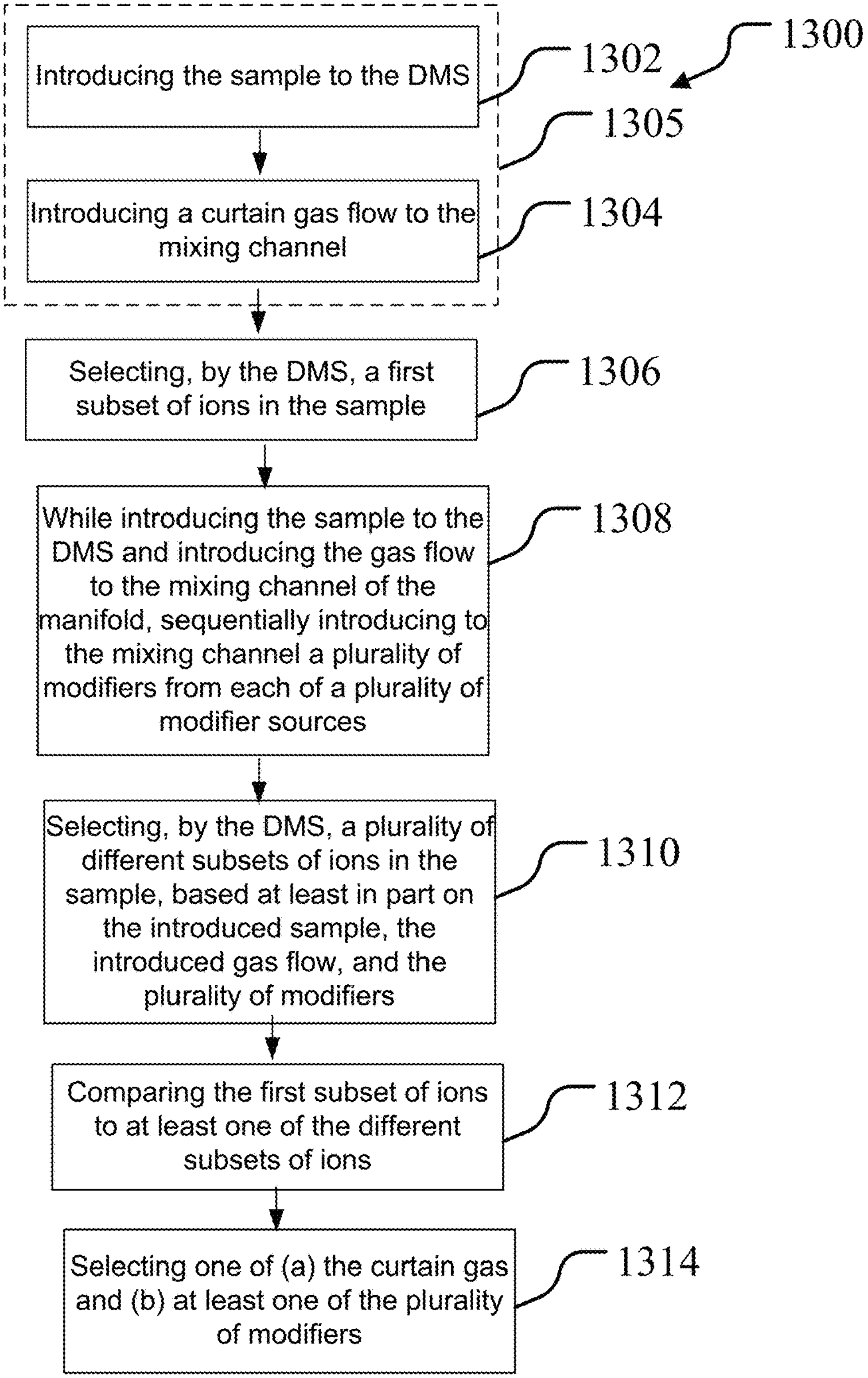
FIG. 13 depicts a method of processing a sample with a DMS-MS system.

FIG. 13 depicts a method 1300 of processing a sample with a DMS-MS system. The technologies described herein that include automatic introduction of various modifiers allow for separation and distinguishing between all species within a sample, though less than all such conditions need be met.

The method 1300 describes general operation of a DMS-MS system including a manifold such as depicted in FIG. 8. The method 800 begins with introducing the sample to the DMS, operation 1302. The sample may first be passed through an ionization source, such that detectable ions of the sample enter the DMS. In operation 1304, a curtain gas flow is introduced to the mixing channel. As such, operations 1302 and 1304 are performed substantially simultaneously, as indicated by dashed box 1305. Various sequences are contemplated. For example where multiple samples are processed sequentially, the curtain gas flow of operation 1304 may be maintained while a series of chemical modifiers are individually introduced to the DMS. Once one sample is processed, a subsequent sample may be introduced (along with sequentially introduced modifiers). In other examples, a single chemical modifier may be introduced to the DMS while multiple samples are sequentially introduced. Once all samples are introduced, a subsequent chemical modifier may be introduced along with each sample. Maintaining curtain gas flow may assist in robustness as well as purging modifiers that may be present in the system at the end of processing a first sample, prior to processing a subsequent sample. As the curtain gas and sample flow through the DMS, the DMS selects a first subset of ions in the sample, operation 1306. In operation 1308, introduction of the sample and the curtain gas is maintained, while each of a plurality of modifiers are sequentially introduced from each of the plurality of modifier sources. In examples, the acetate modifier is selected from the group consisting of methylacetate, ethylacetate, propylacetate, and butylacetate. Further, the acetate modifier may be introduced to the gas at greater than about 1.5%, about 2%, about 3%, and about 4% volume/volume.

Thereafter, the DMS selects a plurality of different subsets of ions in the sample, based at least in part on the introduced sample, the introduced gas flow, and the plurality of modifiers, operation 1310. Each introduced modifier alters the ions selected by the DMS. In operation 1312, the first subset of ions (from the sample and curtain gas alone) are compared to at least one of the different subsets of ions (e.g., from the sample, curtain gas, and each introduced modifier). The comparison determines the best separation of the sample ions, e.g., with the curtain gas alone or with the curtain gas plus one of the modifiers. In certain examples, multiple modifiers may be introduced simultaneously, such results may also be compared in the depicted method 1300. The best separation of sample ions is automatically identified, and the best condition (e.g., curtain gas alone, curtain gas plus modifier #1, curtain gas plus modifier #2, etc.) is selected in operation 1314. This selection may be stored with information regarding the sample being tested, which may include an analyte of interest, a sample of interest, a mass of interest, or other information about the sample. Thus, the method 1300 described above allows the ultimate selection to be associated with the introduced sample automatically, without any operator intervention.

The curtain gas flow through the mixing channel may be maintained in an uninterrupted flow condition during performance of the method. Thus, prior to each new modifier being introduced, the flow of a previously-introduced modifier is terminated (e.g., the valve is closed, pump operation terminated, etc.). This helps ensure adequate separation between sequentially introduced modifiers. In examples, a subsequent modifier may be introduced only after a previously-introduced modifier is no longer detected in the curtain gas flow passing through the mixing channel (e.g., is entirely absent therefrom). This detection may be based on a detection (e.g., by the sensor located in the mixing channel), or by an estimation or calculation based on the known mixing channel volume, gas flow rate, modifier flow rate, etc. Alternatively, a second modifier can be introduced immediately after closing the valve to terminate flow of a first modifier to flood the system with a new modifier. Additionally, one or more modifiers may be introduced to the mixing channel simultaneously.

Figure 14:
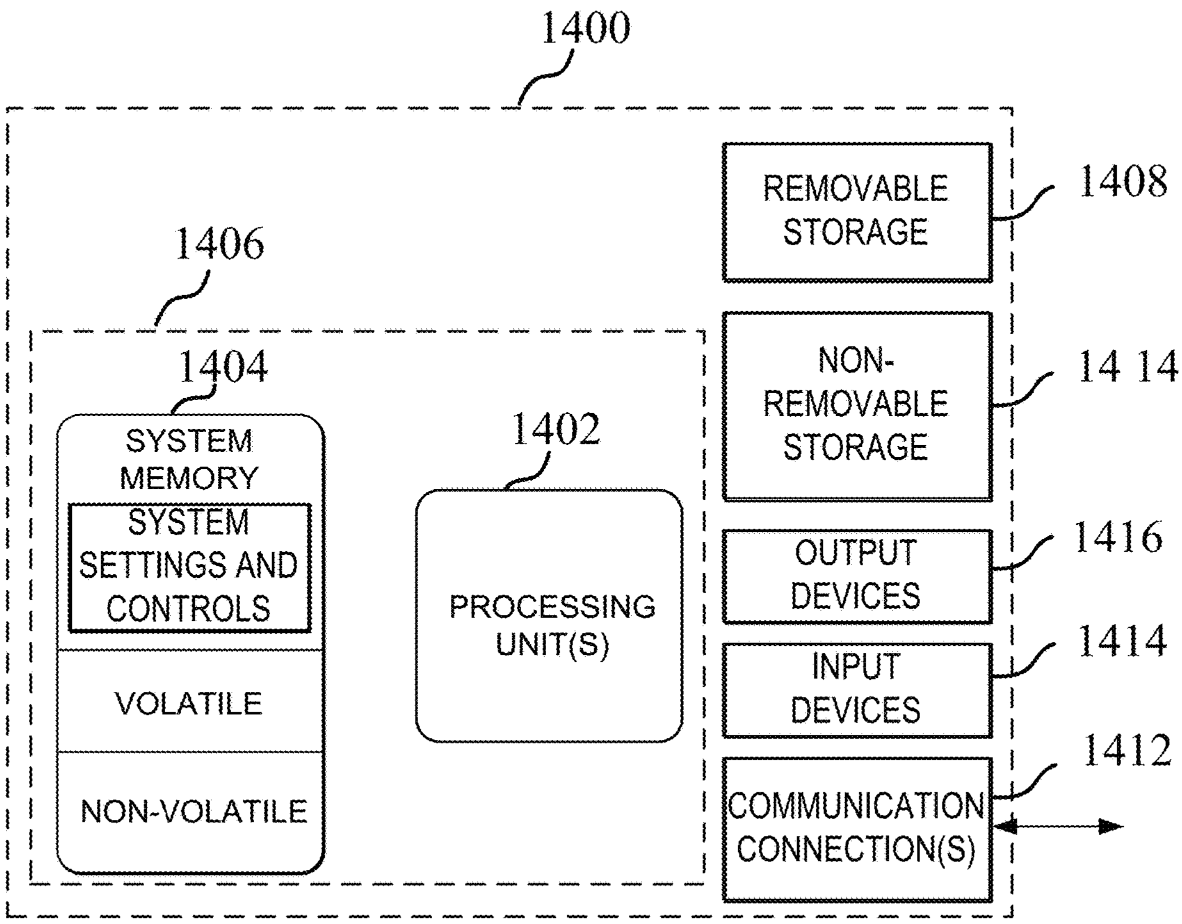
FIG. 14 depicts an example of a suitable operating environment in which one or more of the present examples can be implemented.

FIG. 14 depicts one example of a suitable operating environment 1400 in which one or more of the present examples can be implemented. This operating environment may be incorporated directly into the controller for a DMS-MS system, e.g., such as the controller depicted for example in FIG. 9 or 10. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 1400 typically includes at least one processing unit 1402 and memory 1404. Depending on the exact configuration and type of computing device, memory 1404 (storing, among other things, instructions to activate the valve(s), pump(s), perform analysis, etc., or perform other methods disclosed herein) can be volatile (such as RAM), non-volatile (such as ROM, flash memory, etc.), or some combination of the two. This most basic configuration is illustrated in FIG. 14 by dashed line 1406. Further, environment 1400 can also include storage devices (removable, 1408, and/or non-removable, 1410) including, but not limited to, magnetic or optical disks or tape. Similarly, environment 1400 can also have input device(s) 1414 such as touch screens, keyboard, mouse, pen, voice input, etc., and/or output device(s) 1416 such as a display, speakers, printer, etc. Also included in the environment can be one or more communication connections 1412, such as LAN, WAN, point to point, Bluetooth, RF, etc.

Operating environment 1400 typically includes at least some form of computer readable media. Computer readable media can be any available media that can be accessed by processing unit 1402 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 1400 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 1400 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 1400 is part of a network that stores data in remote storage media for use by the computer system 1400.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A gas introduction system for a differential mobility spectrometer (DMS), the system comprising:
- a manifold comprising:
  - a gas inlet;
  - a gas outlet;
  - a mixing channel fluidically coupling the gas inlet to the gas outlet;
  - a sensor disposed in the mixing channel;
  - a plurality of modifier liquid supply inlets coupled to the mixing channel; and
  - a plurality of selectively operable valves, wherein one of the plurality of selectively operable valves is coupled to one of the plurality of modifier liquid supply inlets; and
- a control system in communication with each of the plurality of the selectively operable valves, wherein the control system is configured to actuate each of the plurality of selectively operable valves.

2. The gas introduction system of claim 1, wherein each of the plurality of the selectively operable valves is coupled to a discrete modifier source.

3. The gas introduction system of claim 2, wherein each of the discrete modifier sources comprises a modifier fluid source and a pump, and wherein the control system is in communication with each of the plurality of pumps and is configured to activate each of the plurality of pumps.

4. The gas introduction system of claim 1, wherein the plurality of modifier liquid supply inlets comprises three modifier liquid supply inlets.

5. The gas introduction system of claim 1, wherein the manifold comprises a unitary body component.

6. A system for processing a sample, the system comprising:
- a differential mobility spectrometer (DMS) comprising an inlet;
- a manifold coupled to the DMS, wherein the manifold comprises a mixing channel;
- a gas source fluidically coupled to the mixing channel;
- a plurality of modifier sources fluidically coupled to the mixing channel;
- a processor; and
- memory storing instructions that, when executed by the processor, cause the system to perform operations comprising:

introducing the sample of the DMS while introducing a gas flow from the gas source to the mixing channel;

selecting, by the DMS, a first subset of ions in the sample, based at least in part on the introduced sample and the introduced gas flow;

while introducing the sample to the DMS and introducing the gas flow to the mixing channel of the manifold, sequentially introducing to the mixing channel a plurality of modifiers from each of the plurality of modifier sources;

selecting, by the DMS, a plurality of different subsets of ions in the sample, based at least in part on the introduced sample, the introduced gas flow, and the plurality of modifiers;

comparing the first subset of ions to at least one of the different subsets of ions; and based at least in part on the comparison, selecting one of (a) a curtain gas and (b) at least one of the plurality of modifiers.

7. The system of claim 6, wherein sequentially introducing to the mixing channel a plurality of modifiers comprises introducing a subsequent modifier to the mixing channel immediately after terminating flow of a first modifier to the mixing channel.

8. The system of claim 6, wherein sequentially introducing each of the plurality of modifiers comprises actuating a valve and a pump associated with each of the plurality of modifier sources.

9. The system of claim 6, wherein the operations further comprise:

receiving information associated with the sample, wherein the information comprises at least one of an analyte of interest, a mass of interest, and a sample of interest; and associating the selection based on the comparison with the received information.

10. The system of claim 6, wherein the plurality of modifiers comprise three modifiers.

11. The system of claim 6, further comprising a mass spectrometer (MS) downstream of the DMS, and wherein the operations further comprise analyzing an output of the DMS by the MS.

* * * * *